US007764769B2

(12) United States Patent
Salafia et al.

(10) Patent No.: US 7,764,769 B2
(45) Date of Patent: Jul. 27, 2010

(54) INTEGRATED CALL HANDLER AND EMAIL SYSTEMS AND METHODS

(75) Inventors: Christopher Michael Salafia, Killingworth, CT (US); Jeremy Edward Turk, Guilford, CT (US); Philip M. Salafia, Old Lyme, CT (US); Francois Gerard Koutchouk, Castro Valley, CA (US)

(73) Assignee: PowerPhone, Inc., Madison, CT (US)

( * ) Notice: Subject to any disclaimer, the term of this patent is extended or adjusted under 35 U.S.C. 154(b) by 136 days.

(21) Appl. No.: 11/835,208

(22) Filed: Aug. 7, 2007

(65) Prior Publication Data

US 2008/0064363 A1 Mar. 13, 2008

Related U.S. Application Data

(63) Continuation of application No. 11/621,473, filed on Jan. 9, 2007, and a continuation-in-part of application No. 10/913,880, filed on Aug. 6, 2004, now Pat. No. 7,515,693.

(60) Provisional application No. 60/821,915, filed on Aug. 9, 2006.

(51) Int. Cl.
*H04M 11/00* (2006.01)
*H04M 11/04* (2006.01)
(52) U.S. Cl. .................... 379/45; 379/37; 379/93.24

(58) Field of Classification Search ............ 379/37–45, 379/93.24, 88.13, 88.17; 455/404.1
See application file for complete search history.

(56) References Cited

U.S. PATENT DOCUMENTS

| 5,625,668 | A | * | 4/1997 | Loomis et al. | 455/456.5 |
| 5,831,665 | A | * | 11/1998 | Dezonno | 348/14.11 |
| 6,370,234 | B1 | * | 4/2002 | Kroll | 379/45 |
| 2003/0046421 | A1 | * | 3/2003 | Horvitz et al. | 709/238 |
| 2005/0175167 | A1 | * | 8/2005 | Yacoub et al. | 379/265.13 |

* cited by examiner

*Primary Examiner*—Melur Ramakrishnaiah
(74) *Attorney, Agent, or Firm*—Maier & Maier, PLLC

(57) ABSTRACT

Apparatuses, systems and methods are presented for handling calls. In one embodiment, an emergency call handling system capable of receiving visual information from callers and correlating the visual information to particular incidents is disclosed. To obtain visual information, a call handler may generate and send an electronic mail message to the caller. The caller may reply to the electronic mail message and attach an image captured with, for example, a camera phone. The visual information may then be correlated to the call between the caller and call handler. In addition, unsolicited visual information received by the emergency call handling system may be prioritized, triaged and delivered to the call handler. The visual information may be used to assess an emergency situation. The visual information may be forwarded to emergency service providers.

27 Claims, 11 Drawing Sheets

FIG. 5

INTEGRATED CALL HANDLER AND EMAIL SYSTEMS AND METHODS

CROSS REFERENCE TO RELATED APPLICATIONS

This patent application is a continuation-in-part of pending U.S. patent application Ser. No. 11/621,473 (filed Jan. 9, 2007), which is incorporated by reference in its entirety herein and claims priority to U.S. Provisional Patent Application No. 60/821,915 (filed Aug. 9, 2006), which is incorporated by reference in its entirety herein. This patent application is also a continuation-in-part of pending U.S. patent application Ser. No. 10/913,880 (filed Aug. 6, 2004), which is incorporated by reference in its entirety herein.

BACKGROUND

Call handling of either emergency or non-emergency related situations is a process of interacting with a caller to exchange information. The caller may have contacted a particular agency or service provider to gain assistance. A call handling system is the system used by a call handler to communicate with the caller. For example, a caller may dial 911 seeking emergency assistance. Another example is where a caller dials an information service to obtain driving directions or addresses. In either situation, the call may be handled by a call handler using a call handling system.

A particular caller may contact a particular agency or service provider to forward information. For example, a caller may dial 911 to report an emergency situation that the caller has witnessed, such as a crime, an automobile accident or a building fire. An example of a non-emergency situation would be where the caller calls to report local driving or weather conditions or a crime tip line. Whether the caller is calling to gain assistance or report information, a call handler, who may be specially trained in quickly and efficiently exchanging information with a caller, may handle the call.

A critical application of call handling is in the provision of emergency services. In an emergency situation, the call handler may need to quickly extract information from the caller in order to assist the caller. Such is typically the case in emergency medical situations where the call handler must ascertain the type and extent of injury in order to give relevant instructions. Generally, in an emergency situation, a caller will dial 911 and be connected to a local Public Safety Answering Point (PSAP). The PSAP is generally staffed with a group of specially trained call handlers. Typically, the call handlers will respond to callers according to protocols, often dispatching emergency service providers. Call handling is often employed with Computer Aided Dispatch (CAD) systems that dispatch response units, such as police, fire and/or medical units, based on received information. For example, call handling of prior art CAD systems typically involves call handlers who receive calls describing certain events. The call handlers subsequently convey this information to a dispatch unit by manually inputting information into the CAD system, which then recommends the appropriate dispatch unit(s) for response to the event.

Typically, a call handler working in a PSAP will receive textual information, displayed on a computer terminal, regarding the probable location of a caller. If the caller is calling from a landline, systems at the PSAP may access an automatic location information (ALI) database to determine the location of the caller. Accordingly, errors in the ALI database may result in incorrect determinations of caller location. Therefore, the call handler may need to verify the location of the caller. If the caller is calling from a mobile wireless device (e.g., cell phone), location information, if available at all, may not be determinable in the same manner as for landlines. Location information of a caller using a mobile wireless device presented to a call handler may be derived from triangulating signals transmitted by the cell phone. The accuracy of such a location may be dependent on the number of cell towers and signal strength. Global Positioning System (GPS) location data may also be available if the caller is using a cell phone with GPS capabilities. However, GPS systems may be unreliable, for example, if the caller is indoors. Accordingly, in the case of mobile wireless devices, the call handler may need to provide and/or verify the location of the caller.

Generally, the location of the caller is only one part of the information that is exchanged between the caller and the call handler in an emergency situation. For example, at the scene of a major traffic accident, the caller may need to communicate the number of people injured, the number of vehicles involved, location and condition of the vehicles, current conditions (e.g., fog, ice, etc.), and many other aspects of the situation. In current emergency call handling systems, all of this information is communicated verbally between the caller and the call handler and the call handler may forward this information, either verbally or textually, to at least one emergency services provider.

SUMMARY

This invention generally relates to call handling. More specifically, this invention relates to correlating call information to visual information received from the caller. The present inventors have recognized that many aspects of the process of call handling may be significantly enhanced through the incorporation of the transfer of visual and/or textual information. The transfer of visual information may occur between a caller and a call handler. For example, in an emergency situation, a caller may dial 911 to contact a call handler at a PSAP. It may then be beneficial for the caller to transfer visual information regarding the emergency to the call handler. By reviewing the visual information, the call handler may gain a better understanding of the emergency situation. The call handler may forward the information, including the visual information, to at least one emergency services provider.

The visual information may, for example, include information regarding the exact location of the caller. This may be particularly valuable where the caller is calling from a mobile wireless device, such as a cell phone, and an exact location would otherwise be unavailable or difficult to obtain. The visual information may include images of a victim, a suspect, an accident scene or any other emergency or non-emergency subject that may enhance the effectiveness of the communication between the call handler and caller. The call handler may also send information to the caller, such as, for example, visual instruction on how to handle a particular situation or perform a particular task, images, forms, or Uniform Resource Locators (URLs).

Whether in an emergency situation or a non-emergency situation, the transfer of visual information between the caller and the call handler may result in faster and more efficient transfer of information. In emergency situations, this may result in faster and more appropriate provision of emergency services. A call handler may also forward the visual information received from the caller to third parties, such as, for example, an emergency services provider. The emergency services provider may use the visual information to determine an appropriate response, for example, in terms of equipment, personnel and procedures to be used in response to the emergency.

The visual information may serve as a recordation of the events that prompted the caller to contact the call handler. The visual information may be an image of a suspect and may serve as evidence in a criminal investigation. The visual information may be in the form of an image of a vehicle involved in an accident or crime. The visual information may be of a suspected missing person. The visual information may be used as evidence in subsequent civil proceedings. The visual information may be used to help determine a cause of an emergency situation or be used by investigators to analyze a particular chain of events.

Accordingly, systems and methods are presented herein to enable the efficient transfer of visual information between a caller and a call handler. These systems and methods provide the aforementioned benefits. It will be appreciated that other benefits of the ability to quickly and efficiently transfer visual information between a caller and call handler will be apparent to those skilled in the art and are intended to be within the scope of the present invention.

In an aspect of the present invention, an information processing system is provided that includes a network interface, a telephonic interface, a call handler interface, a storage unit, and a processing module. The network interface may be operable to receive and transmit packetized information over a computer network. In one embodiment, the computer network may be the Internet. The packetized information may be in the form of electronic mail messages consisting of text, visual information in the form of image files, or a combination thereof.

The telephonic interface may be used for audio communication between at least one call handler and at least one caller over a telephone network. In one embodiment, the telephone network may be the public switched telephone network (PSTN), a cellular network, or a combination thereof. The telephonic interface may be a standard telephone headset or handset. The telephone network may include a PSAP. The audio communication may be an emergency related, non-emergency related, or a combination thereof. In one embodiment, the audio communication between the caller and the call handler may be emergency related. To initiate the audio communication, the caller may dial 911.

The call handler interface may be operable to generate at least one outgoing message. The call handler interface may be operable to send the outgoing message to the caller. The outgoing message may include a unique identifying component. In one embodiment, the call handler interface may be in the form of a personal computer or computer terminal accessible by the call handler. The outgoing message may be an electronic message, for example, an electronic mail message. The call handler interface may be operable to present to the call handler a plurality of outgoing message templates. The call handler may then select a particular outgoing message template that is appropriate for the circumstances of the call. The selecting of the outgoing message template may be in the form of selecting a particular outgoing message template identified by a menu item or an item in a pull-down menu presented to the operator by a display screen of the call handler interface. The call handler may then use the selected outgoing message template to generate an outgoing message to be sent to the caller. The outgoing message may be sent over the computer network.

The unique identifying component of the outgoing message may, for example, be located in a message header of the outgoing message. In one embodiment, the unique identifying component may be a string of alphanumeric characters. For example, the unique identifying component may include alphanumeric characters representing the date on which the outgoing message was first generated concatenated with a sequential serial number.

The storage unit may be configured to store information related to the caller, the particular call between the caller and the call handler, or any combination thereof. In one embodiment, the storage unit may, for example, be a hard drive such as those commonly used to store information in digital form.

The processing module may be coupled to the storage unit, the call handler interface, and the network interface. The unique identifying component of a particular outgoing message may be stored in the storage unit in relation to information pertaining to the particular call that resulted in the generation of the outgoing message. The processing module may be operable to correlate an incoming message received over the computer network to the information pertaining to the particular call that resulted in the generation of the outgoing message and the subsequent reception of the incoming message. In one embodiment, the processing module may be operable to present to the call handler the incoming message along with information related to the particular call that resulted in the reception of the incoming message.

In another aspect of the present invention, an emergency call handling system is provided that includes a network interface module, a communication interface, a call handler interface, a storage unit, and a processor module. The network interface may be operable to receive and transmit packetized information over a computer network, such as the Internet. The communication interface may be interconnected with a PSAP. The call handler interface may generate an outgoing message that includes a unique identifying component. The storage unit may store the unique identifying component in relation to a record of a call. The processing module may correlate incoming messages received over the computer network to the record, stored in the storage unit, of a particular call. The call handler interface may display at least part of an incoming message along with a record of the specific call with which the incoming message was correlated.

In another aspect of the present invention, a call handling system is provided that includes a database, a call handler interface, and an electronic message processing module. The database may be configured to store a plurality of electronic message templates, information regarding a call from a caller, and a unique identifying component for the call. The call handler interface may be operable to enable a call handler to select an electronic message template from the plurality of electronic message templates stored in the database. The call handler interface may be operable to initiate the sending of an electronic message to the caller, where the electronic message contains the unique identifying component for that call. The call handler interface may be operable to display information regarding the call and an image contained in a response to the electronic message sent by the call handler. The electronic message processing module may be operable to correlate the information regarding a particular call to the image contained in a response from the caller to the electronic message received by the caller. In one embodiment, the call may be emergency related.

In still another aspect, a method of communicating with a caller is provided that includes receiving a call, making a decision, based on the call, to obtain visual information from the caller, assigning a unique identifying component to a first message, including that unique identifying component in the first message, sending the first message, receiving a second message in response to the first message, and correlating the second message to the call. The call may be received over a telephone network, such as the PSTN, and may be emergency related. The decision to obtain visual information may be made as a result of the interaction between a call handler and a caller. The first message may be generated by selecting a message template from a plurality of available message templates. The first and second messages may be electronic mail messages. The unique identifying component assigned to the first message may be located in a header of the first message.

The first message may be sent to the caller over a computer network, such as the Internet. In one embodiment, the first message may contain an instruction regarding how to reply to the first message. For example, the instruction may direct the caller to reply to the first message by creating a second message and attaching visual information to the second message. This may be accomplished by the caller by, for example, attaching an image captured with a camera phone to a reply to the first image and sending that reply message (i.e., the second message) to a call handler. In one embodiment, the electronic mail message address of the caller may be determined and inserted into the first message prior to sending. The electronic mail message address of the caller may be determined by concatenating the phone number of the caller with a domain name of the caller. The domain name may be obtained by looking up the domain name in a database for the particular service provider of the caller.

The second message may contain visual information. The second message may contain the unique identifying component that was inserted into the first message. The visual information contained in the second message may be correlated to the call based on the unique identifying component. In one embodiment, the method of communicating with the caller may include displaying information about the call along with the visual information provided in the second message.

The method may include forwarding the visual information received in the second message. The visual information may be forwarded to an emergency services provider.

In a yet another aspect, a method of correlating visual information to a call is provided. The method includes receiving a call from a caller, sending an electronic mail message to the caller where the message includes a unique identifying component, receiving a reply message from the caller where the reply message includes the unique identifying component and visual information, and correlating the reply message to the call at least partially based on the unique identifying component.

In an additional aspect, an information processing system is provided that includes a message priority module, a triage interface, and an integration module. The message priority module may be operable to assign priority scores to electronic messages received by the information processing system. The triage interface may be operable to display at least a portion of the electronic messages along with corresponding priority scores assigned by the message priority module. The triage interface may be operable to display a single message based on that message's corresponding priority score (e.g., the triage interface may display the electronic message with the highest priority score). The integration module may be operable to present "triaged" electronic messages to a communications system. Such an information processing system may be operable to process and prioritize unsolicited incoming messages.

In an embodiment, the information processing system may further include a communications module operable to receive electronic messages over a computer network, such as the Internet. Such messages may be packetized for delivery over the computer network. The messages may be in the form of electronic mail messages. The messages may include text, audio, images, video clips, or any combination thereof. The communications module may be operable to selectively forward the received electronic messages to the message priority module. This selective forwarding may be based at least in part on the source of the received electronic messages. The messages may be emergency related. In the latter regard, the information processing system may, for example, be configured to process solicited and unsolicited messages received by a PSAP or other emergency response system.

In an embodiment, the information processing system may include an information database. The database may include data relating to unique identifying components correlated to communications events. Incoming messages containing such unique identifying components may be forwarded directly from the message priority module to the integration module. The database may also include data relating to phone numbers correlated to predeterminable sources, phone numbers correlated to communications events, locations of communications events, or any combination thereof. The information processing system may be operable to communicate with a database (e.g., an Automatic Number Identification (ANI) database and/or an ALI database) containing location information for cellular phone users. The message priority engine may determine a particular priority score based, at least in part, on a source of that particular message.

The triage interface may allow an operator, such as a triage interface operator, to process the messages in an order at least partially based on the assigned priority score. In this regard, the triage interface may be operable to order the electronic messages based on the assigned priority scores. This ordered list may allow a triage interface operator to select and forward at least one of the received and triaged messages to the communications system. The communications system may, for example, be an electronic messaging system, a call handling system, or a combination thereof. In embodiments where the communications system includes a call handling system, the call handling system may, for example, be a CAD system, a Records Management System (RMS), or any other system designed to handle communications between a caller and a call handler.

In an embodiment, the information processing system may include a reporting interface. The reporting interface may be operable to report on the status of various components of the information processing system. For example, the reporting interface may be operable to present statistics pertaining to the performance and status of the communications module, the message priority module, the triage interface, the integration module, or any combination thereof.

In still another aspect, an emergency call handling system is provided that includes a communications module, a message priority module, a triage interface, a call handler workstation, and an integration module. The communications module may be operable to receive packetized messages over a computer network, such as the Internet. The message priority module may be operable to assign emergency-related priority scores to the received messages. The triage interface may be operable to display at least a portion of the received messages along with corresponding emergency-related priority scores assigned by the message priority module. The call handler workstation may include an audio interface and a computer terminal. The integration module may be operable to present triaged, received messages to the call handler through the call handler workstation.

In another aspect, a method is provided for processing a message for display at a communications workstation. The method includes receiving a message over a computer network, verifying the message is from an approved source (e.g., a cellular phone), assigning a priority score to the received message, forwarding the received message to the communications workstation based on the assigned priority score, and displaying the forwarded received message at the communications workstation. In an embodiment, the communications workstation may be a call handler workstation.

In yet another aspect, a method is provided for performing triage on a plurality of received messages. The method includes receiving a plurality of messages over a computer network, assigning an emergency related priority score to each of the received messages, and ordering the received messages based on the assigned emergency related priority scores. The emergency related priority score may, for example, be based on the source of the message, the origination location of the message, or a combination thereof. In particular, the priority score may reflect messages where the message originated from an emergency responder, a known emergency information provider, a source related to previously received calls, a source related to a call previously placed, a source related to a currently active emergency situation, or a combination thereof.

In another aspect, a call handling system is provided that includes a message priority module. The message priority module may be operable to assign priority scores to electronic messages received by the call handling system. In an embodiment, a triage interface may be included. The triage interface may be operable to display at least a portion of the electronic messages along with corresponding priority scores assigned by the message priority module. In an embodiment, the call handling system may include an integration module. The integration module may be operable to present triaged electronic messages to a call handler. The call handling system may further include a telephonic interface for audio communication between a call handler and a caller over a telephone network.

In yet another aspect, a method is provided for contacting potential eyewitnesses to an event. The method may include determining a location and a time period of an event, obtaining a listing of cellular phones proximate to the location during the time period of the event, and delivering messages to the cellular phones proximate to the location during the time period. In an embodiment, the obtaining step may include querying an ANI/ALI database. The listing of cellular phones may be prioritized based on information related to the cellular phones.

Various embodiments and aspect described herein may be combined. Embodiments, features and steps described in conjunction with a particular aspect may be combined with other aspects described herein. Additional aspects and corresponding advantages of the present invention will be apparent to those skilled in the art upon consideration of the further description that follows.

BRIEF DESCRIPTION OF THE DRAWINGS

FIG. 5 is an illustration of a graphical user interface for communicating textual and visual information to a call handler.

DETAILED DESCRIPTION OF THE DRAWINGS

Figure 1:
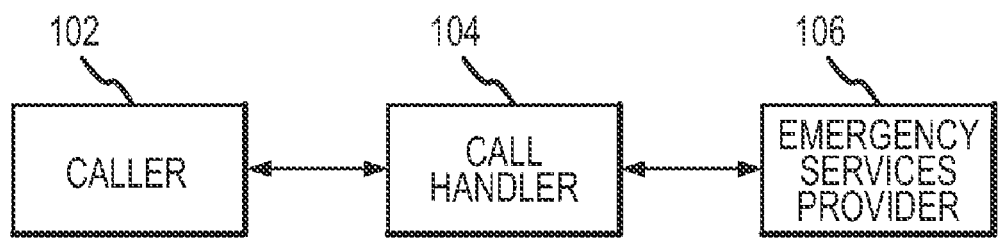
FIG. 1 is a block diagram of communication flow between a caller, a call handler and an emergency services provider.

While the invention is susceptible to various modifications and alternative forms, specific embodiments thereof have been shown by way of example in the drawings and will herein be described in detail. Those skilled in the art will appreciate that the features described below can be combined in various ways to form multiple variations of the invention. Accordingly, the invention is not limited to the specific examples described below.

FIG. 1 is a block diagram of communication flow between a caller 102, a call handler 104, and an emergency services provider 106. Generally, the caller 102 may initiate communication with the call handler 104. In the case of an emergency call, the caller 102 may dial 911 and be routed to an appropriate emergency services call handler 104. The caller 102 and the call handler 104 may exchange information regarding an emergency situation. The call handler 104 may also contact the emergency services provider 106. The emergency services provider of block 106, as used herein, may represent a single emergency services provider such as an ambulance service, or the emergency services provider of block 106 may represent multiple emergency services providers that may be engaged during any particular emergency situation. For example, in a large-scale emergency, multiple firefighting, law-enforcement, and medical units may be dispatched.

The call handler 104 may exchange information with the emergency services provider 106 regarding the emergency and the status of the caller 102. Generally, in prior art systems, the information exchanged between the caller 102 and call handler 104 is in the form of oral communications over a telephone network. Other information, such as location data of the caller 102, is also provided to the call handler 104, generally by equipment and databases interconnected to the telephone network. This information may also be provided to the emergency services provider 106.

Embodiments described herein provide systems and methods, which supplement the above information with visual information. This visual information may be captured by the caller 102, for example, with a camera phone, and forwarded to the call handler 104 using the apparatuses, systems and methods described herein. The call handler 104 may use the visual information in a variety of ways such as, for example, to determine a location of an emergency situation and/or to determine a course of action. The call handler 104 may forward the visual information to at least one emergency services provider 106 using the apparatuses, systems and methods described herein. The emergency services provider 106 may use the visual information, for example, to assess an emergency situation prior to arrival, to determine a location of the emergency situation, and/or otherwise assist in the provision of emergency services. The visual information may also be used in later investigations of, for example, the emergency situation and/or the performance of the call handler 104 and/ or the emergency services provider 106 in their response to the emergency situation and provision of emergency services.

Figure 2:
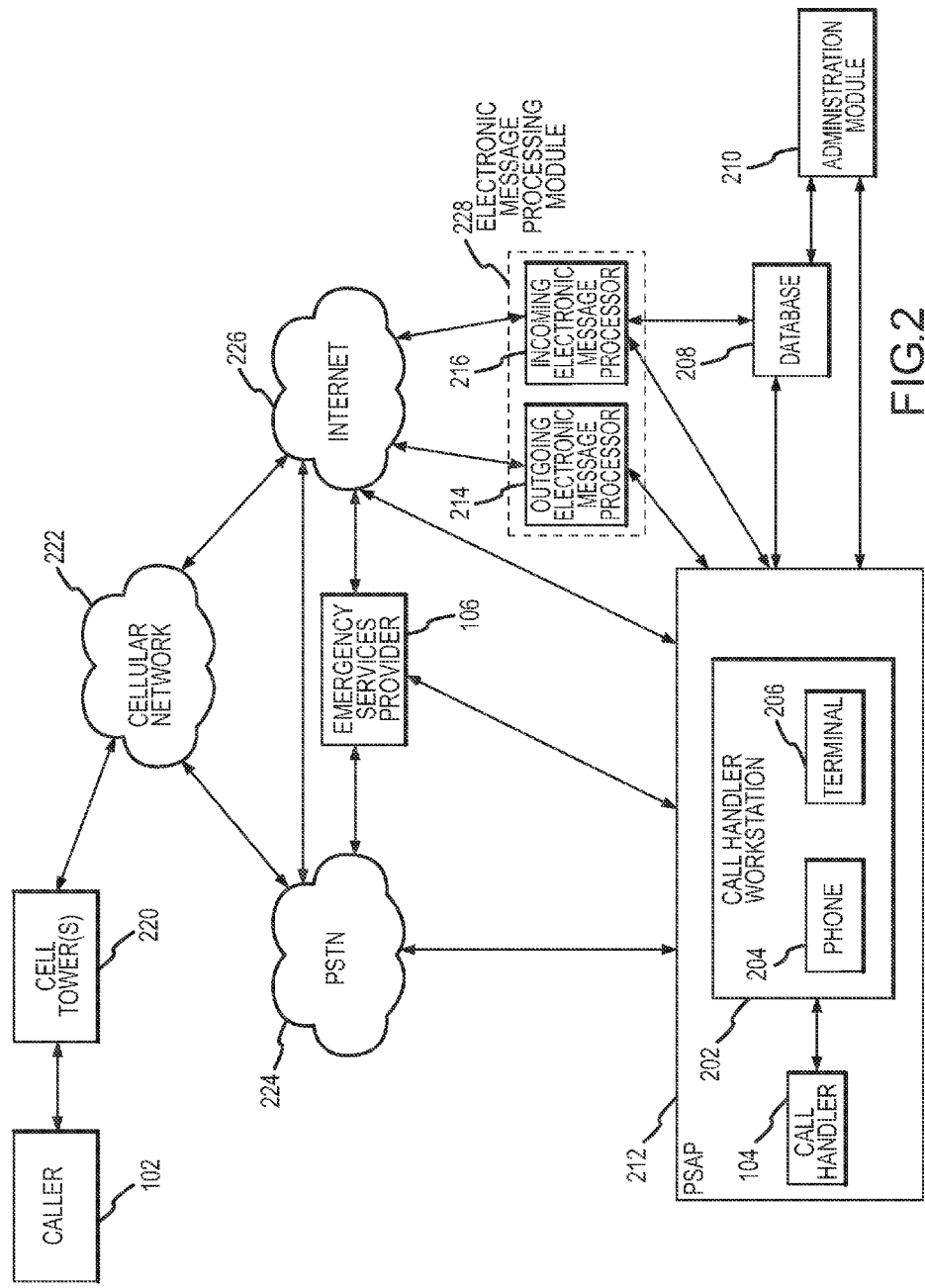
FIG. 2 is a block diagram of a communication network.

FIG. 2 is a block diagram of one embodiment interconnected to various communication networks to enable communication, including the transfer of visual information, between the call handler 104, the caller 102, and the emergency services provider 106. In the embodiment illustrated in FIG. 2, the caller 102 is communicating using a cell phone. Although generally described herein in terms of a caller 102 communicating using a cell phone, the caller 102 may be interconnected through other means such as, for example, land lines and satellite links. A caller 102 with the ability to receive and send electronic messages may communicate with the call handler 104 using the apparatuses, systems and methods described herein.

The caller 102 may be interconnected to one or more proximate cell towers 220 through wireless communication links. The cell towers 220 may be interconnected to a cellular network 222. The cell phone of the caller 102 may have the capability to generate, send, and receive electronic messages. The cell phone of the caller 102 may also have the capability to capture visual information which may be in the form of digital images which may be still images and/or video clips. The cell phone of the caller 102 may also have the capability to capture audio information. The electronic messages may be in the form of text messages and/or messages including visual and/or audio information.

The cellular network 222 may in turn be interconnected to the PSTN 224 and the Internet 226. A PSAP 212 may be interconnected to the PSTN 224. The PSAP 212 is typically a local facility responsible for answering 911 calls and forwarding related information to emergency service providers 106. The PSAP 212 may contain multiple call handler workstations such as call handler workstation 202. The call handler workstation 202 may contain a phone 204 for audio communications with the call handler 104 and a terminal 206. The terminal 206 may be in the form of a computer interface including, for example, a video display device, keyboard and mouse. The PSAP 212 may be interconnected to the emergency services provider 106 in a variety of ways. For example, the PSAP 212 may be directly connected to the emergency services provider 106 via a dedicated communication line or wireless communication link. Alternatively or additionally, the PSAP 212 may be connected to the emergency services provider 106 via the PSTN 224.

A typical prior art 911 call from a cell phone user will now be described with reference to the aforementioned features of FIG. 2. The caller 102 dials 911 on his or her cell phone and presses send to connect the call. The cell phone communicates with one or more proximate cell towers 220 and interconnects with the cellular network 222. The cellular network 222 in turn interconnects with the PSTN 224 and the call is routed to a PSAP 212. Textual information about the call may appear on the terminal 206 of a call handler workstation 202 and an audio communication link between the caller 102 and the call handler 104 may be established. The textual information may include location data forwarded to the PSAP 212 by the cellular network 222. The location data may, for example, be based on cell tower 220 location and cell phone signal attributes or on GPS information obtained from the cell phone, the cellular services provider or some other source. The textual information may include a phone number of the caller 102. The call handler 104 and the caller 102, via the established audio communication link, discuss the emergency situation and the call handler 104 determines the appropriate emergency services provider 106 to respond to the emergency situation. The call handler 104 may then communicate details of the emergency situation to the emergency services provider 106. The call handler 104 may maintain communication with the caller 102 and the emergency services provider 106 as needed.

Additional features of FIG. 2 that facilitate textual and visual communication between the call handler 104 and the caller 102 will now be described. Currently, many cell phones and cellular networks possess the ability to generate, send, and receive electronic messages, such as electronic mail (e.g., e-mail), through interconnection to the Internet 226. Many cell phones possess the ability to capture visual information in the form of digital images, including still images and digital video. The PSAP 212 may contain or be interconnected to an electronic message processing module 228. The electronic message processing module 228 may facilitate the sending and receiving of electronic messages between the PSAP 212 and the Internet 226 and therefore to any other user or users connected to the Internet 226. This may be accomplished through one or more network interfaces of the electronic message processing module 228. In this regard, electronic messages may be communicated between the PSAP 212 and the caller 102.

The electronic message processing module 228 may include a single electronic message processing unit capable of processing incoming and outgoing electronic messages or the electronic message processing module 228 may, as shown in FIG. 2, include an outgoing electronic message processor 214 and an incoming electronic message processor 216. The incoming electronic message processor 216 may be linked to a database 208. The database 208 may contain information pertaining to outgoing electronic messages (i.e., outgoing from the PSAP 212) and telephone communications between various callers and the PSAP 212. The database 208 may also contain other various sets of information such as templates used in the generation of electronic messages and information related to domain names used by various cellular communication providers. The database 208 may be located within or remote from the PSAP 212. The database 208 may be an information storage unit such as, for example, a computer hard drive. An administration module 210 may also be interconnected to the database 208 and the PSAP 212. The administration module 210 may facilitate the maintenance and updating of various components within the PSAP 212. As with the database 208, the administration module 210 may be located within or remote from the PSAP 212. The PSAP 212 may also be directly interconnected to the Internet 226. Similarly, the electronic message processing module 228 may be located within the PSAP 212. The electronic message processing module 228 may be located within the call handler workstation 202.

Figure 3:
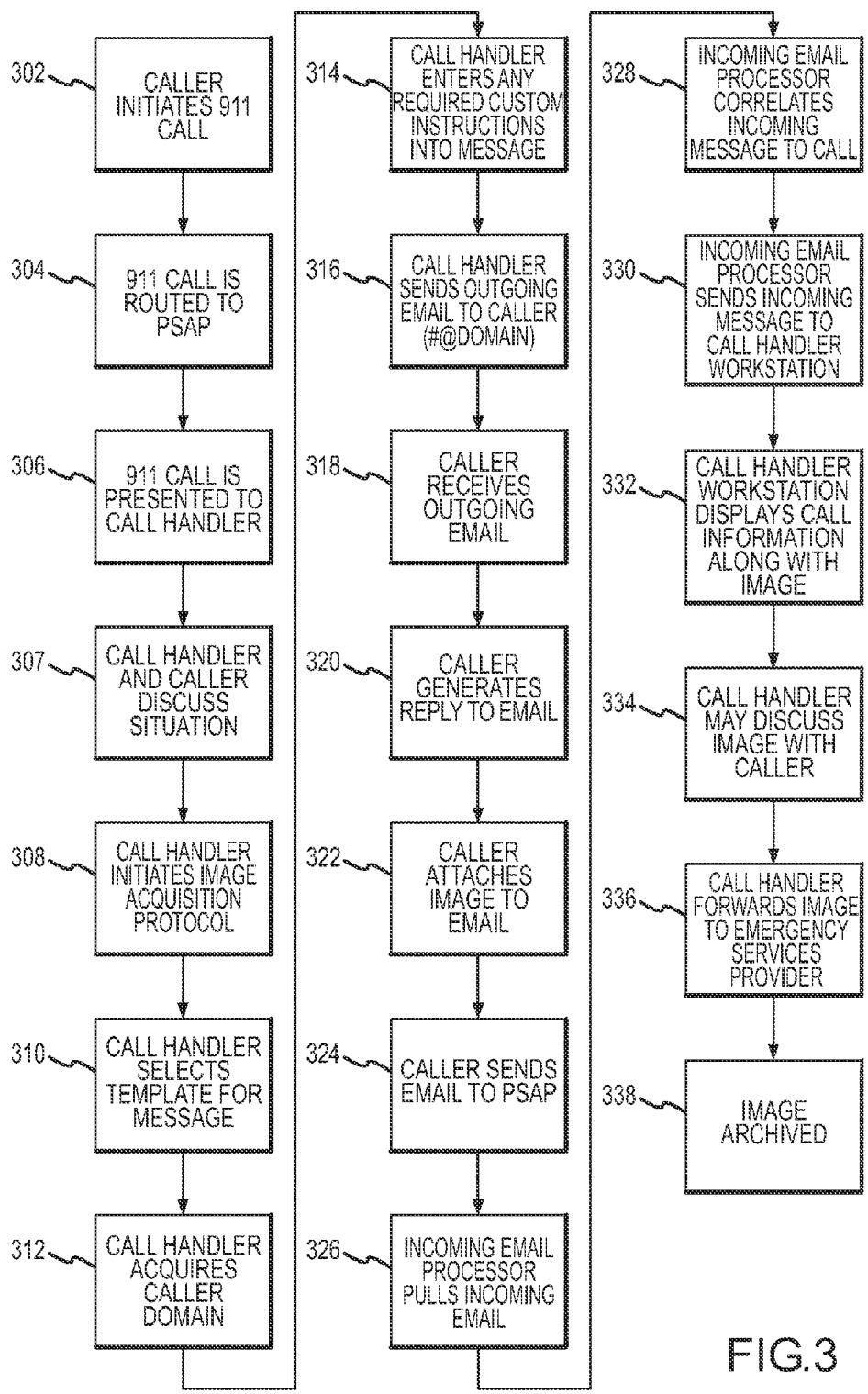
FIG. 3 is a flowchart of a process for handling an emergency call and gathering visual information.

FIG. 3 is a flowchart of an exemplary process for handling an emergency call and gathering visual information. The steps of FIG. 3 will now be described in detail in conjunction with the features illustrated in FIG. 2.

The first step 302 is the caller initiating an emergency call. This may be in response to a perceived emergency such as a medical emergency, a crime, an accident, or other situation requiring the presence of an emergency services provider 106. The initiation of the call may take the form of a caller 102 dialing 911 on his or her cell phone. This will initiate communication between the cell phone and one or more local cell towers 220 which will enable the caller 102 to communicate with the cellular network 222 of the caller's 102 cellular service provider. In the next step 304, the call may be routed through the cellular network 222 to the PSTN 224 and to the PSAP 212. The routing of cellular calls to appropriate PSAPs may be accomplished in a variety of ways known to those skilled in the art.

In the next step 306, the call may be presented to the call handler 104 at the PSAP 212. This may be in the form of a visual display of data associated with the call displayed on the terminal 206 of the call handler workstation 202 and a telephonic connection between the call handler 104 (via a phone 204) and the caller 102. The visual display of data on the terminal 206 may include information such as, for example, the telephone number of the caller 102, the cellular service provider of the caller 102, and approximate location of the caller 102, the name of the person or entity associated with the cell phone, and the time and date of the call. The visual display of data on the terminal 206 may be received from an ANI/ALI database. Other information may also be presented to the call handler 104 to assist the call handler 104 in the handling of the call. This may include blank fields for information to be determined by the call handler 104 during the course of the call.

The next step 307 may be for the call handler 104 and caller 102 to discuss the emergency situation. The discussion may be guided by emergency call protocols followed by the call handler 104. The discussion may include a determination by the call handler 104 that the caller 102 has the capability to send and receive electronic messages and that additional information in the form of a textual message or visual message from the caller 102 would be of value. The value may be immediate in that the information contained in the electronic message may, for example, aid in the response to the emergency situation. The value may be less immediate in that, for example, the information may serve as evidence for a later criminal investigation or forensic evidence for an investigation into the causes of the emergency situation.

Once it has been determined that an electronic message from the caller 102 would be beneficial, the next step 308 may be for the call handler 104 to initiate an image acquisition protocol. This initiation may take any of a variety of forms, such as entering a command using a keyboard or clicking on a button on the display of the terminal 206 using a mouse. Once the image acquisition protocol has been initiated, the call handler workstation 202 or a computer system within the PSAP 212 may generate a unique identifying component, which may be used to identify an outgoing message from the call handler 104 to the caller 102 and a possible future incoming message or messages from the caller 102 to the PSAP 212. The unique identifying component may be a unique string of alphanumeric characters. The unique string may be generated based on the time of the request for the unique string, the previously generated unique string (e.g., the unique strings may be sequential), or on any other suitable methodology. In an implementation, the unique string may be a numeric string representing the date of the call along with a sequential number where the sequential number is reset to 1 at the beginning of each day. The unique identifying component may be stored in a database 208 along with or in relation to information that identifies a particular call between the caller 102 at the call handler 104.

Figure 4:
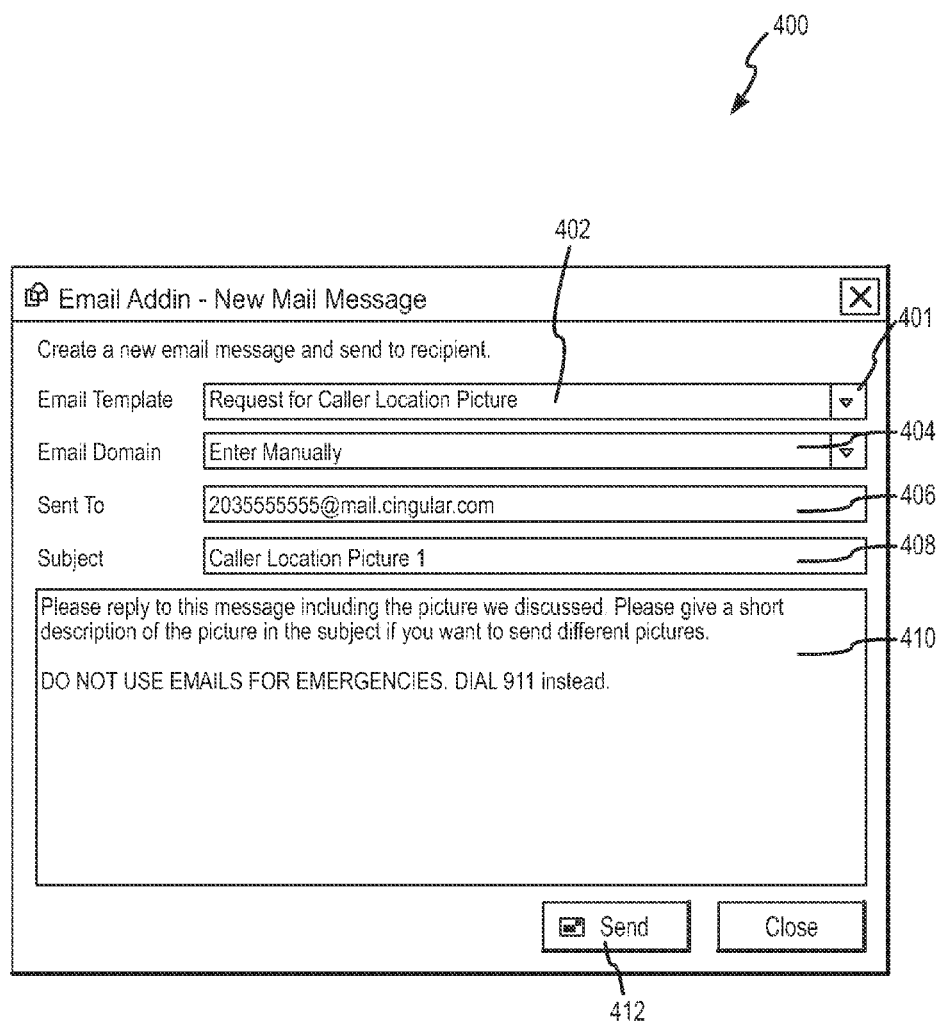
FIG. 4 is an illustration of a graphical user interface usable to generate an electronic mail message.

A pop-up window 400, such as that illustrated in FIG. 4, may be displayed on the terminal 206 in response to the initiation of the image acquisition protocol by the call handler 104. The pop-up window 400 may present multiple electronic mail templates to the call handler 104 in the form of a pull down list of electronic mail templates accessed by activating the pull-down menu button 401 adjacent to the electronic mail template window 402 and selecting an appropriate electronic mail template. For example, and as illustrated in FIG. 4, an electronic mail template may be titled "Request for Caller Location Picture." The electronic mail template "request for caller location picture" 402 may be one of several electronic mail templates available. Other electronic mail templates may, for example, include templates to instruct the caller 102 to provide images of: a location of an incident, a particular item such as a suspicious package, suspected hazardous material, a victim, a vehicle involved in an accident, and a suspect. Through the administration module 210, electronic mail templates may be added, removed or modified by administrative personnel.

Once an electronic mail template has been selected by the call handler 104 in step 310, pre-determined fields of the electronic mail may be automatically populated. For example as shown in the pop-up window 400 when the "request for caller location picture" electronic mail template is selected, the system may automatically populate the electronic mail with a subject 408 titled "caller location picture 1" and pre-determined text in the body 410 of the message. The predetermined text, as illustrated in FIG. 4, may include instruction on how to reply to the electronic mail. Not shown in FIG. 4, but nonetheless a part of the electronic mail message, is the unique identifying component which may be attached to the electronic mail message. For example, the unique identifying component may be located within a message header that is generally not displayed for a user. The header containing the unique identifying component may be a custom header. In one implementation, the outgoing email may include a custom header named "Call-ID."

The next step 312 may be for the call handler 104 to acquire a domain name for the caller 102. This step may include the call handler 104 determining the service provider of the caller 102 and selecting an appropriate domain name from a pull-down menu of domain names 404 located in the pop-up window 400. For example, and as illustrated in FIG. 4, the call handler 104 may determine that the caller's 102 service provider is Service Provider X. The call handler 104 may then select Service Provider X from the pull-down menu of domain names 404. The system may then automatically populate the "send to" field 406 with the domain name used by Service Provider X, which may be "@mail.ServProX.com". The call handler 104 may manually enter a domain name for the caller 102. The call handler 104 may then determine a phone number from which the caller 102 is calling and enter that information as the specific address in the "send to" field 406. The call handler 104 may obtain the caller's 102 domain name and/or phone number from the display of caller information presented to the call handler 104 on the terminal 206 of the call handler workstation 202. The call handler 104 may obtain the caller's 102 domain name and/or phone number by other methods such as, for example, asking the caller 102. Alternatively, the call handler workstation 202 may automatically populate the "send to" field 406 with the caller's 102 phone number and domain name. This may then be verified by the call handler 104 during the course of the call. Information correlating particular service providers to particular domain names used by users of that service may be present in the database 208. The database 208 may be accessible by the call handler 104. The database 208 may also be used to lookup domain names by the system when the call handler workstation 202 automatically populates the "send to" field 406. The database 208 may be updated through use of the administration module 210.

The next step 314 may be for the call handler 104 to enter any required custom instructions into the electronic mail message. The custom instructions may be generated as a result of the discussion between the call handler 104 and the caller

102. The next step 316 may be for the call handler 104 to send the electronic mail message to the caller 102. The call handler 104 may perform this function by clicking on or activating a send button 412 in the pop-up window 400.

The electronic mail message may then be transferred from the call handler workstation 202 to an outgoing electronic message processor 214. The outgoing electronic message processor 214 may send the electronic mail to the caller 102 over the Internet 226 and the caller's 102 cellular network 222. Accordingly, the next step 318 may be for the caller 102 to receive the electronic mail from the call handler 104. The outgoing electronic message processor 214 may packetize the outgoing message for delivery over the Internet 226 to the caller 102.

The caller 102 may generate a reply to the electronic message from the call handler 104 in the next step 320. This may be followed by the step 322 of the caller 102 attaching an image to the reply message. The image may have been previously captured or it may be captured after the caller 102 receives the electronic message from the call handler 104. As previously stated, the image may be a still image or a video image (e.g., a sequential series of still images with or without accompanying audio). The next step 324 may be for the caller 102 to send the reply message to the PSAP 212. By generating the reply message as a response to the electronic message from the call handler 104, the reply message may contain the unique identifying component that was part of the electronic message sent from the call handler 104 to the caller 102.

During typical operation, the incoming electronic message processor 216 may periodically pull incoming electronic messages (e.g., electronic mail messages) from a configured inbox by, for example, using POP3 protocol. Other protocols, however, may be used, such as the IMAP protocol. The inbox may be configured to receive and reassemble packetized messages. The incoming electronic message processor 216 may perform this function periodically at a predeterminable interval. The incoming electronic message processor 216 may perform this function in response to a specific request such as, for example, a request from the call handler 104 or a supervisor. The incoming electronic message processor 216 may be separate from the outgoing electronic message processor 214. Alternatively, the incoming electronic message processor 216 and the outgoing electronic message processor 214 may both be part of an electronic message processing module 228. For example, the functions described herein of the outgoing electronic message processor 214 and incoming electronic message processor 216 may both be performed by the same computer or electronic device.

Returning to the process illustrated in FIG. 3, the next step 326 may be for the incoming electronic message processor 216 to pull the incoming electronic mail from the caller 102 from the configured inbox. The next step 328 may be for the incoming electronic message processor 216 to correlate the unique identifying component contained within the reply electronic mail to the call between the caller 102 in the call handler 104. This may be followed by step 330 where the incoming electronic message processor 216 sends the reply message from the caller 102 to the call handler workstation 202 of the particular call handler 104 who is handling the call for the caller 102. The entire reply message may be sent to the call handler 104 or only the image contained within the message may be sent to the call handler 104.

The next step 332 may be for the call handler workstation 202 to display the visual information sent by the caller 102 along with information pertaining to the call between the caller 102 and the call handler 104. The display may be automatic in that it pops-up on the terminal 206 without any call handler 104 action. Alternatively, an alert may appear somewhere on the display screen of the call handler workstation 202 and/or an audible signal may be produced to alert the call handler 104 that an image is available. The call handler 104 may then activate a button or other feature to view the visual information.

Figure 5:
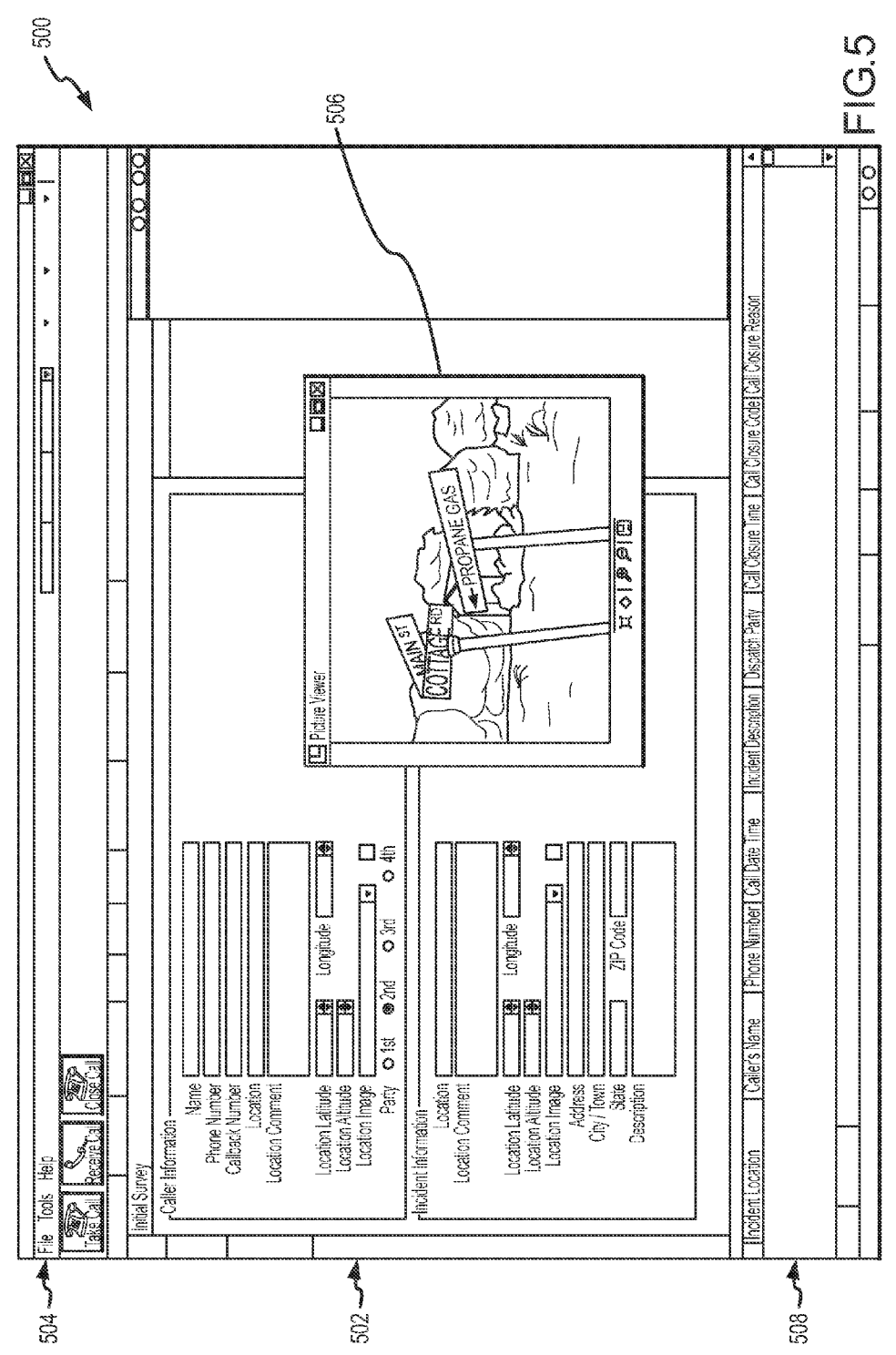

An example of a display including visual information according to step 332 is illustrated in FIG. 5. Call display window 500 is an exemplary window that may display call information on the terminal 206 of the call handler workstation 202. The call display window 500 may include a listing section 508 where recent calls to the PSAP 212 or to the particular call handler workstation 202 within the PSAP 212 may be displayed. This display, for example, may be in the form of a list as illustrated in FIG. 5. The main window 502 may display details of an in-process call between the call handler 104 and the caller 102. The main window 502 may display details of a particular call by selecting a call in the listing section 508. As illustrated in FIG. 5, the main window 502 is displaying details of an in-process call between the call handler 104 and the caller 102. As illustrated, such information may include caller 102 name, a phone number, and location.

Other information may also be displayed. Some of the information contained in the fields within the main window 502 may be populated automatically by the call handler workstation 202 with information derived from the original call. For example, known methods of transferring information between a caller and a receiver of that call such as caller ID and the aforementioned accessing of the ANI ALI database may be used to populate fields within the main window 502. During the call between the call handler 104 and the caller 102, the call handler 104 may also manually populate fields within the main window 502 with information regarding the call as it is discovered by the call handler 104. Such information may include details about the situation that prompted the caller 102 to call the call handler 104 (e.g., by dialing 911).

Returning to the process illustrated in FIG. 3 and step 332 in particular, the display of the visual information sent by the caller 102 may take the form of a pop-up window 506 which may appear on the terminal 206 of the call handler workstation 202. The pop-up window 506 may appear or pop-up when the call to which the pop-up window 506 has been correlated is displayed in the main window 502. In this regard the visual information within the pop-up window 506 and the textual information within the main window 502 are linked and are configured to appear together on the terminal 206 of the call handler workstation 202.

The sequence of events with respect to the sending and receiving electronic messages between the caller 102 and the call handler 104 may vary, for example, depending on PSAP 212 protocols and capabilities and on equipment capabilities of the caller 102. For example, the caller 102 may place an emergency call that is routed to the PSAP 212 and during that call, receive and reply to the electronic mail sent by the call handler 104. In such a scenario, the pop-up window 506 may appear in front of the call handler 104 while the call handler 104 is still a direct audio communication with the caller 102. In another scenario, the caller 102 may disconnect from the call handler 104, then proceed to receive and reply to the electronic message of the call handler 104, and then reconnect with the call handler 104. This reconnection may be through the caller 102 initiating the call or through the call handler 104 initiating the call. In yet another scenario, the caller 102 may disconnect from the call handler 104, then proceed to receive and reply to the electronic mail message without ever reestablishing an audio connection with the call handler 104. As can be readily appreciated, other scenarios or sequences of audio communication and information transfer between the caller 102 any call handler 104 may take place.

Returning to the process illustrated in FIG. 3, in the next step 334, the call handler 104 may discuss the image within a pop-up window 506 with the caller 102. This discussion may, for example, relate to details of the image, the current situation of the caller 102, or any other topic regarding the situation that prompted the original call from the caller 102.

The next step 336 may be for the call handler 104 to forward the image (or images) to one or more in emergency services providers 106. Such a transfer of visual information between the call handler 104 located within the PSAP 212 and the emergency services provider 106 may be accomplished in a variety of ways. For example, the transfer of information may include transferring information over the Internet 226. Alternatively, the visual information may be transferred from the PSAP 212 to the emergency services provider 106 over the PSTN 224 (e.g., via facsimile transmission). The visual information may be transferred between the PSAP 212 and the emergency services provider 106 via a direct link such as a direct wireless link or a hardwired link between the emergency services provider 106 and the PSAP 212 (e.g., local area network or wireless network connection). Other methods known to those skilled in the art may also be used to transfer the visual information (e.g., hand deliver a print out of the visual information to the emergency services provider 106 in instances where the physical location of the PSAP 212 is close enough to the emergency services provider 106 to make such a delivery method reasonable).

The audio communication link between the caller 102, the call handler 104 and the emergency services provider 106 may continue to be active. In such a scenario, the emergency services provider 106 may request additional information of the caller 102, and the caller 102 may provide additional information in the form of additional verbal information or additional visual information. The various communication links may, for example, remain in place until (and after) the emergency services provider personnel arrive at the location of the caller 102.

After communication between the caller 102 and the call handler 104 has ended, information regarding that communication may be archived in step 338. The archived information may include details regarding the call, call handler 104 notes on the call, the original electronic mail message or electronic mail messages sent from the call handler 104 to the caller 102, and any replies, including any visual information, sent from the caller 102 to the PSAP 212. The archived information may be in the form of a CAD incident record. This archived information may be used later for various purposes including, for example, PSAP 212 performance review, law enforcement investigations, and general emergency situation forensic investigations. The information may be archived in the database 208.

Figure 6:
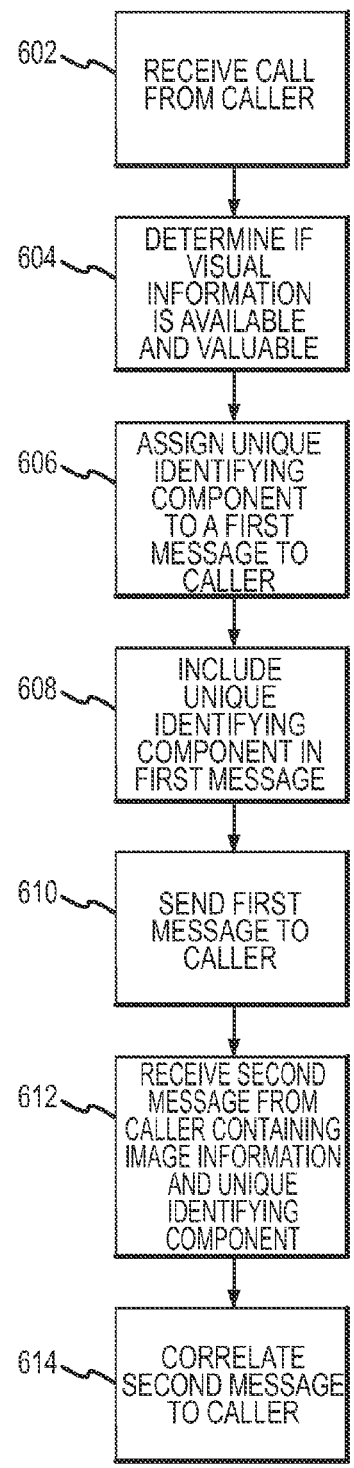
FIG. 6 is a flowchart of a method of communicating with a caller.

FIG. 6 illustrates, in flowchart form, a method of communicating with a caller. The first step 602 in the method is to receive a call from a caller. The call may be received over the PSTN, over the Internet (e.g., VOIP), over any other type of network, or over a combination thereof. The call may be emergency related. The next step 604 may be to determine if visual information is available and would be valuable to aid in the communication with the caller and/or the provision of emergency services.

The next step 606 may be to assign a unique identifying component to a first message to be sent to the caller. The first message may be an electronic mail message. The unique identifying component may be an alphanumeric sequence. The first message may be generated, in part, by selecting a message template from a plurality of message templates. The next step 608 may be to include the unique identifying component in the first message to the caller. The unique identifying component may be located within a header of the first message.

The next step 610 may be to send the first message to the caller. The first message may be sent to the caller over a computer network. The computer network may be the Internet. The first message may include instruction for replying to the first message. The instruction may direct the caller to attach visual information to a second reply message. A domain name used in addressing the first message may be determined based on the service provider of the caller. This determination may include interrogating a database where domain names are cross-referenced to service providers.

The next step 612 may be to receive a second message in response to the first message. The second message may include visual information. The second message may include the unique identifying component that was included in the first message. The unique identifying component may be located in a header of the second message. The second message may be generated by the caller attaching visual information to the second message. The visual information may be in the form of a digital image or digital video. The next step 614 may be to correlate the second message to the received call. The correlation may at least partially be based on the unique identifying component. The correlation step may include populating data fields within the database 208 with information regarding the correlation process. In an implementation, the populated fields include fields for the date and time the second message is received along with information on when and how the second message was correlated or matched to a call. The method may further include displaying the visual information along with information regarding the call. The method may further include forwarding information regarding the call and/or the visual information. This forwarding may be to an emergency services provider.

Figure 7:
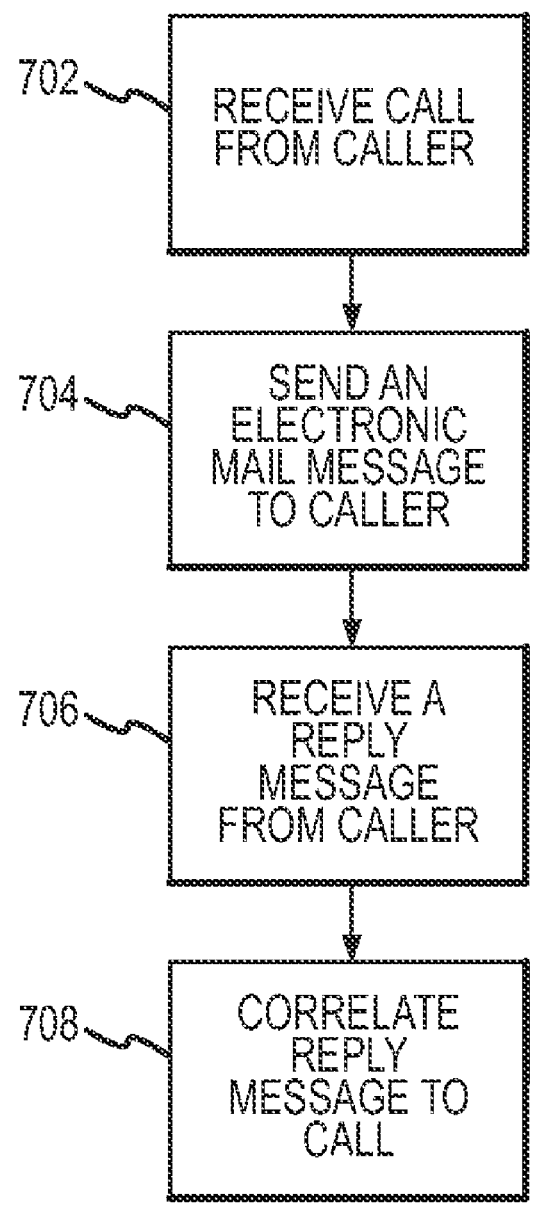
FIG. 7 is a flowchart of a method of correlating visual information to a call.

FIG. 7 illustrates, in flowchart form, a method of correlating visual information to a call. The first step 702 in a method may be to receive a call from a caller. The call may be emergency related. The following step 704 may be to send an electronic mail message to the caller, where the electronic mail message includes a unique identifying component. This may be followed by the step 706 of receiving a reply message from the caller that includes the unique identifying component. The next step 708 may be to correlate the reply message to the call, where the correlation is at least partially based on the unique identifying component. The visual information and information about the call may be displayed. The information regarding the call and the visual information may be forwarded to an emergency services provider. The electronic mail message may be generated by selecting a message template from a plurality of message templates.

When the aforementioned incoming electronic message processor 216 receives an electronic message and is unable to correlate that electronic message to a particular call, the uncorrelated electronic message may be forwarded to or stored in a unique location. This information may then be manually reviewed (e.g., by PSAP 212 personnel) to determine if the information (e.g., visual information attached to the message) contained within the message is pertinent to a current call, a recent call, or other emergency or significant event.

It will be appreciated that, although FIG. 2 illustrates a single call handler workstation 202 within the PSAP 212, typically a PSAP 212 will contain multiple call handler workstations 202 which may be manned by multiple call handlers 104 and that the systems described herein may be operable to forward the relevant electronic messages from the caller 102 to the particular call handler 104 in the PSAP 212 that is handling that particular call. It should also be appreciated that although a single database 208 is illustrated in FIG. 2, each database function described herein may be handled by a separate database. This database (or databases) may be accessed directly as illustrated in FIG. 2 or may be accessed through a connection through other means, such as through the Internet 226 or over the PSTN 224. The databases accessed by the call handler workstation 202 may include ALI and WALI (wireless automatic location information) databases.

Due to the popularity of cell phones and other portable communication devices that possess the ability to capture and transfer visual images, the above descriptions have generally focused on communications between a caller 102 using a cell phone and a PSAP 212. However, the described apparatuses, systems and methods may also be used by callers using different types of equipment. For example, a caller who does not possess a camera phone may still be able to capture digital images and transfer them to the PSAP 212 if they, for example, have a digital camera, the means to download images to a computer, and Internet access from the computer. In such a circumstance, the call handler 104 may direct the outgoing electronic message to an electronic mail address of the user that the user may be able to receive at the computer.

Additionally, the apparatuses systems and methods described herein may be used to deliver non-visual information from the caller 102 to the call handler 104. For example, if the caller 102 perceives an emergency situation as a result of receiving a threatening electronic mail message, the apparatuses, systems and methods described herein may be used to forward the threatening electronic mail message to the call handler 104 and emergency services providers 106. In another example, the caller 102 may have made an audio recording relating to an emergency situation, such as a verbal threat or comment about criminal activity. The audio recording may have been made on the caller's 102 cell phone. In such a situation, the apparatuses, systems and methods described herein may be used to send the audio file to the call handler 104 and emergency services providers 106.

Figure 8:
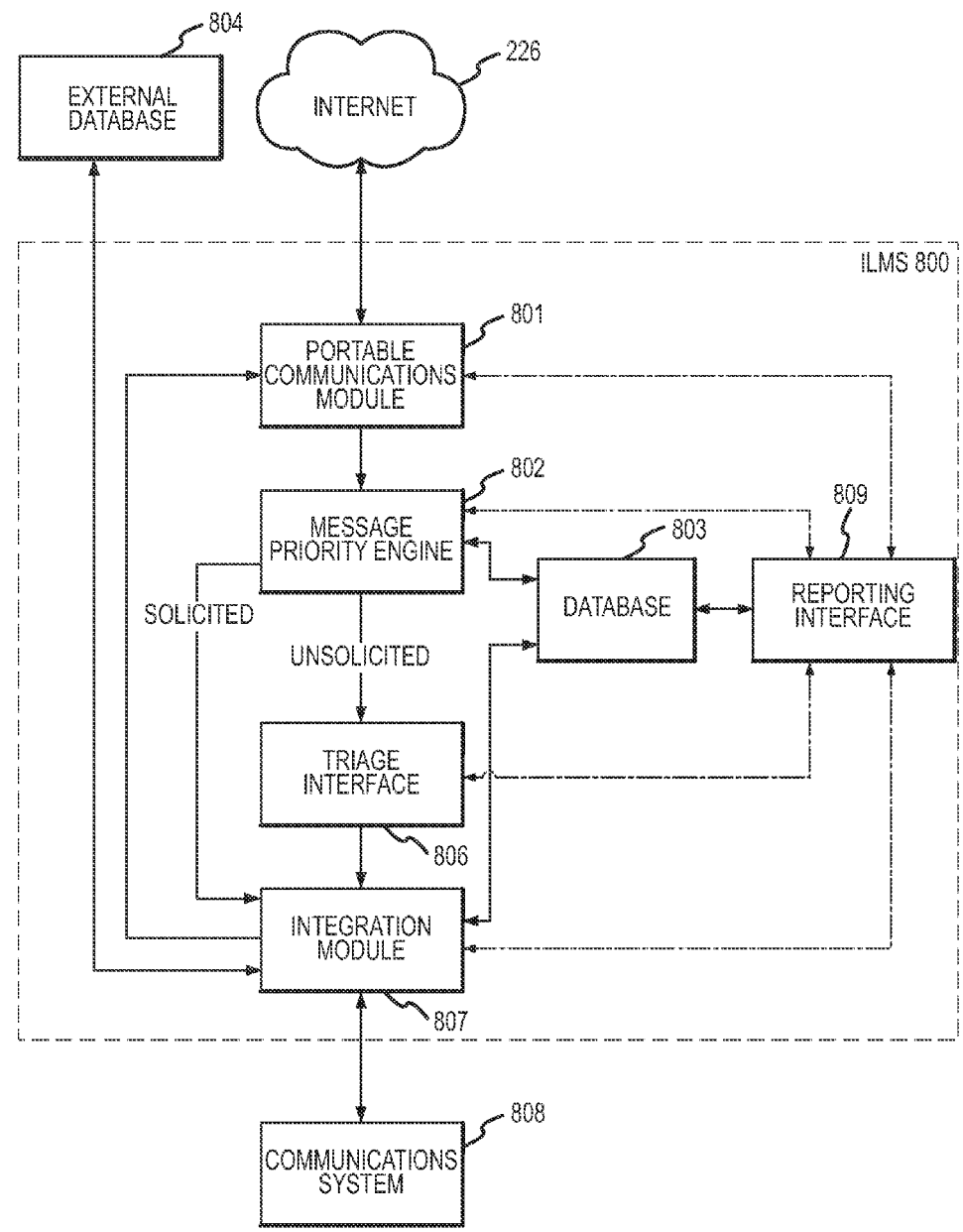
FIG. 8 is a block diagram of a system operable to process certain types of communications.

FIG. 8 is a block diagram of an incident linked multimedia system 800 (labeled "ILMS 800" in FIG. 8) operable to process communications received over a computer network. The received communications may or may not contain a unique identifying component. Such communications may be emergency related, but are not necessarily made in response to a request from a call handler. For example, an emergency situation, such as an automobile accident, may be witnessed by a cell phone user who captures an image of the accident scene with his or her cell phone and immediately sends it to an address set up to receive emergency messages. As will be appreciated, such an address set up to receive emergency messages may receive a significant amount of messages during any particular time period; both emergency and nonemergency related. Accordingly, the incident linked multimedia system 800 may be operable to receive messages, pass messages containing a unique identifying component to a call handler, assign a priority score to received messages that do not contain a unique identifying component, triage the received messages that do not contain a unique identifying component, and forward the prioritized and triaged messages that do not contain a unique identifying component to personnel designated to review such messages. The personnel designated to review such messages may include individuals who are specifically charged with reviewing prioritized and triaged messages. The personnel designated to review such messages may, for example, include dispatchers, operators, call handlers, or any combination thereof.

The incident linked multimedia system 800 may include a portable communications module 801. The portable communications module 801 may be operable to send and receive communications over a computer network, such as the Internet 226. The portable communications module 801 may provide a Simple Mail Transfer Protocol (SMTP) service that is capable of filtering inbound message traffic. The filtered messages may be forwarded to a message priority engine 802, described below. As noted above, a mail address set up to receive emergency related communications may also receive a significant volume of nonemergency related communications. Accordingly, the portable communications module 801 may be configured to filter incoming traffic based on specific criteria.

For example, the portable communications module 801 may be a secure gateway that may restrict inbound traffic to that received from authorized cell phone company servers and other authorized sources. Outbound traffic may also be similarly restricted. In this regard, the portable communications module 801 may filter out communications not originating from cell phone users. The other authorized sources may, for example, include communications addressed to specific unpublished email addresses. For example, emergency messages incorrectly sent to other government entities may be forwarded to a specific unpublished email address. The portable communications module 801 may process such messages similarly to messages received from the authorized cell phone company servers.

The portable communications module 801 may be capable of secure communications (e.g., may employ encryption techniques). Furthermore, the portable communications module 801 may perform self-testing to ensure availability. Such testing may be performed continuously. The portable communications module 801 may be designed to be the fault tolerant and feature redundant components to further ensure availability. Typically, the portable communications module 801 will not store any messages. However, the portable communications module 801 may store messages under certain circumstances, such as, for example, when messages are undeliverable.

The portable communications module 801 may be configured such that messages sent to an emergency mail address are not mixed with regular local government messages. For example, an emergency related domain address could be created such as report911.com (this address is used herein for exemplary purposes only). Messages sent to this domain could be forwarded to appropriate emergency centers. For example, messages sent to Boston@report911.com could be forwarded to a Boston area emergency center whereas messages sent to Philadelphia@report911.com could be forwarded to a Philadelphia area emergency center.

The portable communications module 801 may be a managed service remotely located relative to a PSAP (e.g., PSAP 212 of FIG. 2). Furthermore, a single portable communications module 801 may serve a plurality of incident linked multimedia systems 800 located at various locations. For example, a single portable communications module 801 may handle emergency related Internet-based communications for several PSAPs.

The aforementioned emergency related messages may be forwarded from the portable communications module 801 to the message priority engine 802 associated with the appropriate PSAP. The message priority engine 802 may first determine if an incoming message contains a unique identifying component. If the message does contain a unique identifying component, it may be forwarded directly to an integration module 807, which may present the message to the call handler 104 handling the communications related to the unique identifying component.

For messages that do not contain a unique identifying component, the message priority engine 802 may be operable to assign a priority score to each message. The priority score may represent a determination of the potential relevance of the particular message. The priority score may be at least partially based on attributes of the message and/or attributes of the source of the message.

A priority score assigned by the message priority engine 802 may be related to the cell phone number from which the message originated. For example, a message may be received from a cell phone number recognized to be that of an emergency services provider or other emergency related person or entity. Accordingly, a database 803 may be maintained that contains a list of emergency personnel cell phone numbers. The database 803 may be a part of the incident linked multimedia system 800, as shown in FIG. 8, or it may be external to the incident linked multimedia system 800.

When the message priority engine 802 receives a message from the portable communications module 801, the message priority engine 802 may compare the source of the message to known cell phone numbers contained within the database 803 to determine the priority score for that message. Other cell phone numbers may be present within the database 803 and may be used to assign priority scores. For example, the cell phone numbers of private parties known to provide emergency information may be stored within the database 803. Such private parties may, for example, include private security personnel and private parties known to be participating in neighborhood watch programs.

The status of a particular cell phone number as belonging to an emergency related person or entity may be stored in an external database 804. The external database 804 may, for example, be a database maintained by the PSAP. The external database 804 may, for example, be a database maintained by a telephone service provider or other entity. For example, telephone service providers typically maintain ANI ALI databases. These databases may contain identification and location numbers for the subscribers to the telephone service provider. Special codes may be added to these databases to identify particular cell phone numbers as those related to emergency personnel or entities. Accordingly, the message priority engine 802 may query such databases to determine if a received message is from an emergency related source. Such a query may be accomplished through the integration module 807. It will be appreciated that the message priority engine 802 may query (e.g., through the integration module 807) the local database 803 and/or a remote database 804 (e.g., ANI ALI) to determine if a particular call is from an emergency related source.

The database 803 may also contain a list of cell phone numbers that have been involved with previous emergency events. For example, a specific cell phone number may be known to have provided valuable information during past emergency incidents. Accordingly, the message priority engine 802 may assign a priority score at least partially based on this positive history. Similarly, specific cell phone numbers that have in the past provided false or nonuseful information may also be stored in the database 803 and the message priority engine 802 may assign a priority score at least partially based on this negative history. Other cell phone numbers that have been involved with previous emergency events may also be stored in the database 803. These may include cell phone numbers that exist in the log of outbound calls and/or messages made by an emergency call center.

The database 803 may be updated frequently (e.g., continuously) with information related to the currently active emergency calls being handled by the PSAP. This may include active call caller ID information, queued calls, and any cell phone numbers referenced by a call handler. Cell phone numbers may be referenced by a call handler, for example, where a cell phone number of a third-party has been collected by emergency responders during an incident in progress and/or where a caller mentions a cell phone number during the call. Accordingly, the message priority engine 802 may assign a priority score at least partially based on the relationship between the message source and any currently active calls.

The priority score determined by the message priority engine 802 may also be based on attributes of the source of the message. For example, the message priority engine 802 may query a database such as external database 804 that contains current positions of cell phone users. A cell phone carrier may maintain such a database. Alternatively once queried, the cell phone carrier may determine the position of a particular cell phone. The cell phone carrier may determine the approximate position of a cell phone user by which tower the cell phone user is using to access the cell phone system. The cell phone carrier may be able to obtain a more accurate location by triangulating the cell phone signal between multiple towers. Moreover, cell phones with GPS capabilities may be operable to provide accurate location information. The message priority engine 802 may also query a database that contains the billing addresses of cell phone users. Consequently, the message priority engine 802 may be able to determine the approximate position from which a received message originated or may have originated. The current position and cell phone billing address databases may be accessed through a direct connection or through the Internet 226.

The database 803 may also contain information regarding the location of currently active events being handled by the PSAP. Accordingly, the message priority engine 802 may be capable of querying the database 803 to determine if the location of the source of a received message is proximate to any active communications and assign an appropriate priority score based on such proximity.

A particular user (e.g., a PSAP) may customize the priority score determined by the message priority engine 802 based on factors such as those described above. For example, a particular local government may wish to assign a higher priority score to certain local government employees. Other factors, such as the total time a particular message has been residing in the queue, may also contribute to the priority score assigned to a particular message. The message priority engine 802 may also maintain a listing of all of the current messages that have not been responded to and their corresponding priority score.

After the message priority engine 802 has determined a priority score for a particular message, that message, along with its priority score, may be forwarded to a triage interface 806. The triage interface 806 may allow a call handler 104 or other triage interface 806 operator to process inbound messages that have had a priority score determination. For example, a triage interface 806 operator may view a list of incoming messages along with their priority scores and select the message with the highest priority score for processing. For example, the triage interface may display for the triage interface operator, the message with the highest current priority (e.g., the message with the highest priority score) so that the triage interface operator may process the message.

Once a message is selected or the highest priority message is presented to the triage interface operator, the triage interface operator may use the triage interface 806 to process the message. Several processing options may be available. The selected message may be associated with an existing active call. Once associated, the message may be forwarded to the integration module 807 and the call handler handling the existing active call. As noted, the triage interface operator may be a call handler and accordingly, the triage interface operator may select a message from the triage interface and handle the call himself or herself as the call handler.

The selected message may be associated with an existing closed call. The message may then be reviewed during a post-call investigation or review. The triage interface operator may change the priority level of the selected message. For example, the priority level may be lowered and other higher priority messages may be processed. The triage interface operator may view an explanation of the priority score prior to further processing. The triage interface operator may annotate or add information to the message prior to further processing.

The triage interface operator may respond to the message. The response may be to the sender of the original message, or it may be to another interested party, such as, for example, an individual or location (e.g., a business) described in the original message, or to an individual or location that could use or benefit from the information contained in the original message. Such a response may then be transferred to the portable communications module 801, which in turn may send the response message via the Internet 226.

The triage interface operator may open a new call based on the message and pass the message to the communications system 808 via the integration module 807. The new call may be to the sender of the original message, or it may be to another interested party. The communications system 808 may be CAD system, an RMS, or any other type of call handling system. The communications system 808 may handle emergency and/or non-emergency related calls.

The triage interface operator may forward the message to other types of personnel. For example, the triage operator may forward the message directly to an emergency services provider for an immediate response. For example, the triage interface operator may forward the message to law enforcement authorities for further investigation. Indeed, the triage interface operator may forward the message to any appropriate recipient for any appropriate reason, such as response, investigation, recordation of evidence, and statistics gathering.

The triage interface 806 may support multiple simultaneous users. In this regard, multiple triage interface operators may be simultaneously processing the same priority queue. The triage interface 806 may be accessed by call handlers or other designated personnel at their call handler workstations (e.g., a call handler workstation located within the communications system 808) or other designated workstations. This integration of the triage interface 806 into the call handler workstations or other designated workstations may be accomplished by the integration module 807.

The integration module 807 may be operable to integrate the above noted incident linked multimedia system 800 features into an existing communications system 808, thereby enabling call handlers and other call center personnel to access the incident linked multimedia system 800 features. The integration module 807 may reside outside of the communications system 808 to which it is linked. In this regard, the integration module 807 may be accessible through a Graphical User Interface (GUI) at a call handler workstation 202 or other designated workstation. Such an arrangement may allow a call handler 104 or other designated personnel to access the functionality of the incident linked multimedia system 800 through the integration module 807. Such an arrangement enables the incident linked multimedia system 800 to provide valuable information to call handlers, other designated personnel, responders and callers while minimizing overhead to the communications system 808. Accordingly, the integration module 807 may include program interfaces able to communicate with and be integrated into existing communications 808. The integration module 807 may utilize standards-based XML Web Services to enhance compatibility. In this regard, the integration module 807 may be remotely located from the communications system 808 and communicate with the communications system 808 over an Internet connection. The integration module 807 may include web hosting capabilities and an authentication module to authenticate communications between the integration module 807 and the various communications systems 808 that may be serviced by the incident linked multimedia system 800.

The integration module 807 may also generate outgoing messages to callers that contain unique identifying components as described herein. For example, the call handler 104 may determine that visual information supplied by a caller 102 may be beneficial. Using a GUI at the call handler workstation 202, the call handler 104 may generate an outgoing message containing a unique identifying component. Once generated the message may be transferred to the portable communications module 801 and sent to the caller 102 via the Internet 226. In general, the integration module 807 may serve as an interface between existing communications systems 808 and the message handling and communication systems discussed herein.

The integration module 807 may also generate outgoing messages to callers that contain other types of information. For example, the call handler 104 may send a message to the caller 102 that includes instructions and/or information. The instructions and/or information may, for example, contain text, images, video, audio, forms, URLs, or any combination thereof.

A reporting interface 809 may also be included in the incident linked multimedia system 800. The reporting interface may provide a means to assess the performance of the incident linked multimedia system 800 and its various individual modules and components. This performance assessment may be performed without revealing any confidential information contained within specific communications.

For example, the reporting interface 809 may be operable to report performance statistics related to message delivery times, dropped messages, noncompliant messages, message traffic volume, and message sizes. Such statistics may be sortable in a variety of ways such as by cell phone carrier or by time or date received. The reporting interface 809 may also be operable to generate real-time information regarding the queue of inbound and outbound messages, including routing path, source and target mail servers, and messages awaiting delivery to the message priority engine 802. The reporting interface 809 may also be operable to report on the status and performance of the message priority engine 802. For example, priority score determination processing times may be reported. Also, statistics related to priority score determination, such as the frequency that various criteria are present in a message and used to determine a priority score, may be reported. Furthermore detailed explanations for each determined priority score may be available for review through the reporting interface 809. The reporting interface 809 may also maintain an exceptions list and a log of manual message processing such as message reprioritization.

The reporting interface 809 may also contain information relating to the configuration of the incident linked multimedia system 800. Such information may include current message prioritization parameters, message handling parameters, and communications system 808 access settings.

The reporting interface 809 may also include administrative capabilities or system administration functions may be performed through a separate administration module (not shown) situated similarly to the reporting interface 809. For example, the reporting interface 809 or administration module may allow a user to alter the configuration of the incident linked multimedia system 800. For example, current message prioritization parameters, message handling parameters, and communications system 808 access settings may be changeable through the reporting interface 809 or administration module.

As noted, the incident linked multimedia system 800 may be capable of querying an ANIALI database to determine a potential location of a caller. Similarly, the incident linked multimedia system 800 may be capable of querying a database (e.g., an ANIALI database) to determine all cellular phones that may have been in the area of an incident during a particular time period. For example, if an emergency situation is occurring at a particular location, the incident linked multimedia system 800 may be operable to interrogate an ANIALI database and determine cellular phones in the incident area. Once a listing of cellular phones in the area of an incident during a particular time period is obtained, each cellular phone may be assigned a priority score in a manner similar to as described hereinabove. The listing may then be triaged and messages may be sent to, or call handlers or other designated personnel may call, those cellular phones that, based on their priority scores, are most likely to be able to provide valuable information regarding the incident.

Figure 9:
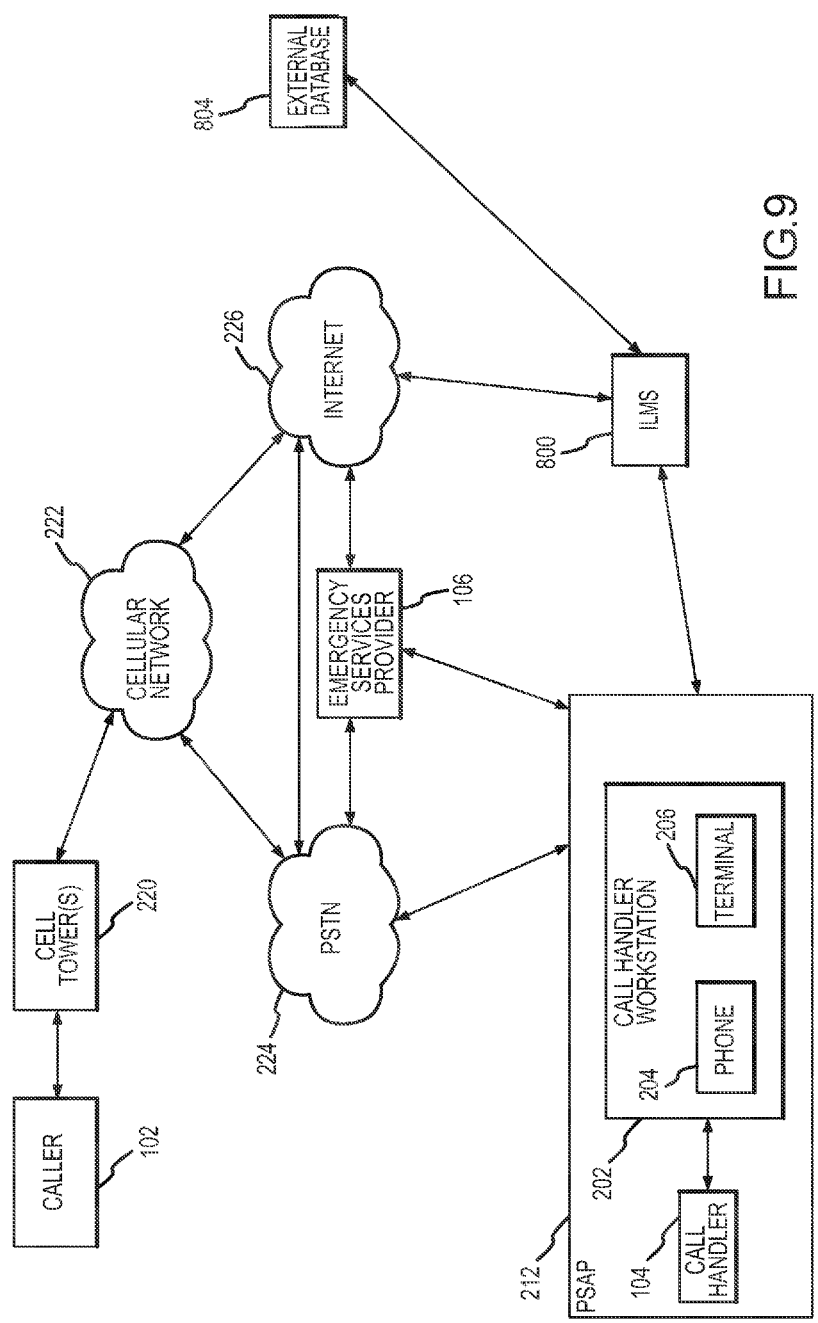
FIG. 9 is a block diagram of an embodiment of the system of FIG. 8 integrated with the system of FIG. 2.

FIG. 9 is an exemplary embodiment of the incident linked multimedia system 800 integrated into a known communications system similar to that of FIG. 2. The incident linked multimedia system 800 provides communication services, such as Internet-based communications including text, images, and video, to call handlers 104 or other designated personnel working at call handler workstations 202 or other designated workstations within PSAPs 212. The incident linked multimedia system 800 may also be operable to communicate with external databases 804 such as ANIALI databases.

Figure 10:
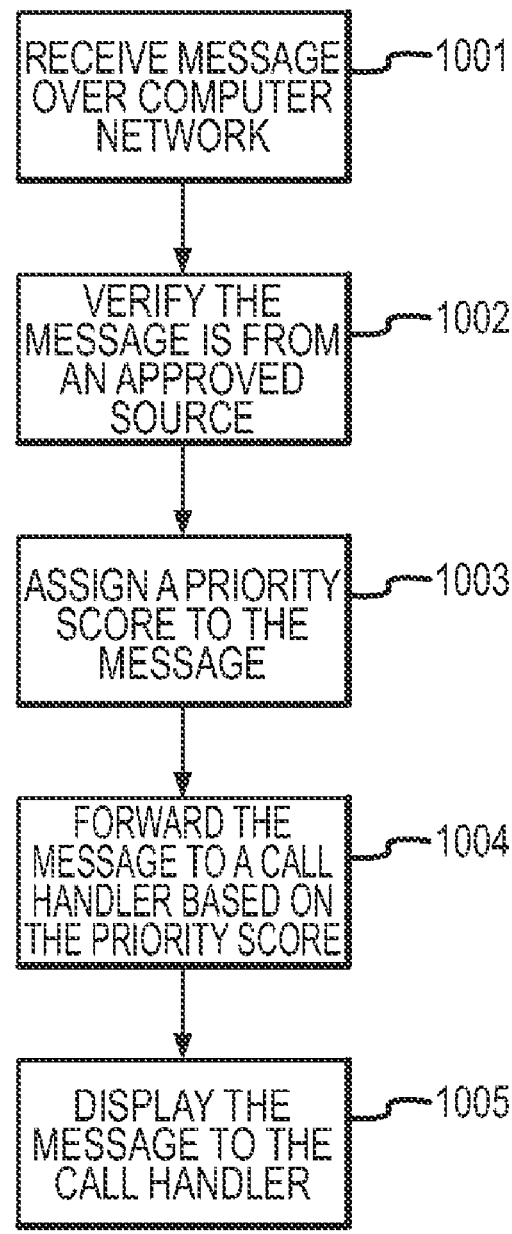
FIG. 10 is a flowchart of a method of displaying a message at a call handler workstation.

The incident linked multimedia system 800 may integrate any of the call handling features and capabilities discussed herein with existing call handling systems (e.g., existing PSTN 224 based PSAPs 212) including those discussed with reference to FIGS. 1 through 7. As a system separate from the PSAP 212, the incident linked multimedia system 800 may be scaled and configured independent of the PSAP 212 systems. Furthermore, a portion of the incident linked multimedia system 800 may interact with multiple PSAPs, leading to homogenization and economies of scale. FIG. 9 illustrates the incident linked multimedia system 800 as a stand-alone program (e.g., middleware) that interfaces with the external database 804, the Internet 226, and the software running at the PSAP 212. In another embodiment, the incident linked multimedia system 800 may be fully integrated with software running at the PSAP 212. FIG. 10 is a flowchart of a method of processing a message for display at a call handler workstation 202. The first step 1001 in the method may be to receive a message over a computer network. The message may be emergency related. The computer network may be the Internet 226. It may then be determined if the message is from an approved source. This may be accomplished, for example, by verifying that the domain from which the message was sent is an approved domain (e.g., white listed). For example, if the message originated from a cellular phone user associated with a particular cellular phone company, the source of the message may be the user's cellular phone number followed by the @ symbol, followed by the cellular phone carrier's domain, followed by .com. If the message is from an approved source, the next step 1002 may be to verify the message as such. The following step 1003 may be to assign a priority score to the message. The message priority engine 802 may perform the assignment of the priority score. The priority score may be related to a potential level of emergency associated with the message. After a priority score has been assigned to the message, the message may be forwarded in the following step 1004 to a call handler workstation 202 based on the priority score. The next step 1005 may be display the message at the call handler workstation 202 on the terminal 206. The display of the message may be immediate or an indicator may be displayed at the call handler workstation 202 and the message may be displayed once a call handler 104 initiates the display of the message (e.g., by selecting the message on the call handler workstation 202 terminal 206). The call handler 104 may then respond to the message in an appropriate manner (e.g., through contact with the message sender or alerting an emergency services provider 106). Although the method of FIG. 10 has been described as forwarding a message to a call handler 104 at a call handler workstation 202, in embodiments where incoming messages are handled by operators, dispatchers or other personnel aside from call handlers 104, the message may be forwarded to that individual at that individual's workstation.

Figure 11:
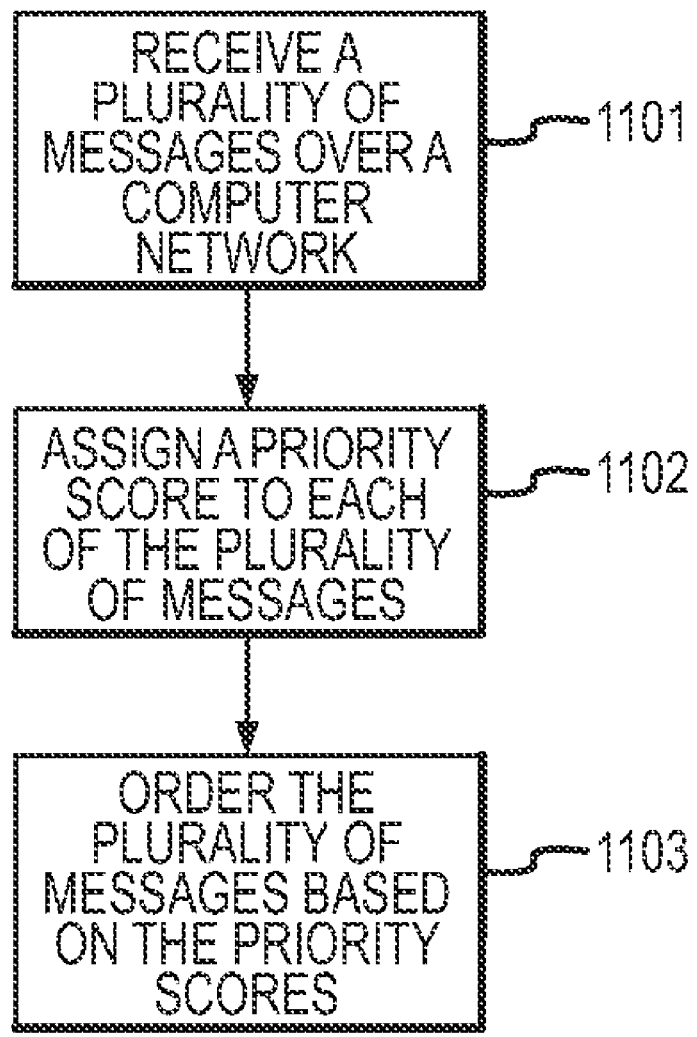
FIG. 11 is a flowchart of a method of performing triage on a plurality of received messages.

FIG. 11 is a flowchart of a method of performing triage on a plurality of received messages. The first step 1001 of the method may be to receive a plurality of messages over a computer network (e.g., the Internet 226). The next step 1102 illustrated in the flowchart is to assign an emergency related priority score to each of the received messages. The emergency related priority score may be based on, among other things, the source of the message, and/or the origination location of the message. In the next step 1103, the messages that have been assigned an emergency related priority score may be ordered based on those scores. Accordingly, the plurality of messages ordered in terms of emergency related priority score may then be reviewed and responded to based on their priority scores. The messages may, for example, have come from one or more of: a phone number of an emergency responder; a phone number of a known emergency information provider; a phone number related to previously received calls; a phone number related to a call previously placed; and a phone number related to a currently active emergency situation.

It will be appreciated that the apparatuses, systems and methods described herein have many uses outside the context of emergency situations and may be used by non-emergency call handling systems. For example, information services that may be enhanced through visual communication, such as services providing driving directions, may also utilize various aspects of the embodiments described herein.

While the invention has been illustrated and described in the drawings and foregoing description, such illustration and description is to be considered as exemplary and not restrictive in character. Embodiments of the invention and minor variants thereof have been shown and described. Those skilled in the art will appreciate variations of the above-described embodiments that fall within the scope of the invention. Protection is desired for all changes and modifications that come within the scope and spirit of the invention. Accordingly, the invention is not limited to the specific examples and illustrations discussed above.

What is claimed is:

1. An information processing system comprising: a message priority module operable to assign priority scores based on a cellular phone number to electronic messages received by said information processing system; a triage interface operable to display at least a portion of said electronic messages along with corresponding priority scores assigned by said message priority module; an integration module operable to present triaged electronic messages to a communications system; a communications module operable to send and receive said electronic messages over a computer network; and said information processing system is operable to communicate with a database containing location information for cellular phone users and a database with a plurality of electronic message templates.

2. The information processing system of claim 1, wherein said computer network is the Internet.

3. The information processing system of claim 1, wherein said communication module is operable to receive electronic messages containing at least one of: electronic mail; text; audio; video; or still images.

4. The information processing system of claim 1, wherein the received electronic messages are comprised of packetized information.

5. The information processing system of claim 1, wherein said communications module is operable to selectively forward received electronic messages to said message priority module.

6. The information processing system of claim 5, wherein the selective forwarding is based at least in part on a source of the received electronic messages.

7. The information processing system of claim 1, wherein said communications module is operable to send electronic messages over said computer network.

8. The information processing system of claim 7, wherein said electronic messages sent from said communications module contain at least one of instructions, images, forms and URLs.

9. The information processing system of claim 1, wherein said electronic messages are emergency related.

10. The information processing system of claim 1, further comprising an information database configured to store information including at least one of:

unique identifying components correlated to communications events;

phone numbers correlated to predeterminable sources;

phone numbers correlated to communications events; or locations of communications events.

11. The information processing system of claim 1, wherein each priority score for a corresponding electronic message is at least in part based on a source of that corresponding electronic message.

12. The information processing system of claim 1, wherein said message priority module is operable to forward a message containing a unique identifying component directly to said integration module.

13. The information processing system of claim 1, wherein said triage interface is operable to order said electronic messages based on said assigned priority scores.

14. The information processing system of claim 1, wherein said triage interface is operable to allow a triage interface operator to select and forward at least one of said received messages to said call handler.

15. The information processing system of claim 1, wherein said communications system is a call handling system.

16. The information processing system of claim 15, wherein said call handling system includes a computer aided dispatch system.

17. The information processing system of claim 15, wherein said call handling system includes a records management system.

18. The information processing system of claim 1, further comprising a reporting interface, said reporting interface operable to present statistics pertaining to the performance and status of at least one of:

a communications module operable to receive said electronic messages over a computer network;

said message priority module;

said triage interface; and said integration module.

19. An emergency call handling system including:

a communications module operable to receive packetized messages over a computer network;

a message priority module operable to assign emergency-related priority scores to said received messages;

a triage interface operable to display at least a portion of said received messages along with corresponding emergency-related priority scores assigned by said message priority module;

a call handler workstation, wherein said call handler workstation includes an audio interface and a computer terminal; and an integration module operable to present triaged received messages to a call handler through said call handler workstation; and said emergency call handling system, is operable to communicate with a database containing location information for cellular phone users and a database with a plurality of electronic message templates.

20. The emergency call handling system of claim 19, wherein said computer network is the Internet.

21. A method of processing a message for display at a communications workstation, said method including: receiving a message over a computer network; verifying said message is from an approved source wherein said approved source is a cellular phone; assigning a priority score based on a cellular phone number to said received message; forwarding, based on said assigned priority score, said received message to said communications workstation; and displaying, at said communications workstation, said forwarded received message and sending a second message with a unique identifying component.

22. The method of claim 21, wherein said communications workstation is a call handler workstation.

23. The method of claim 21, wherein said computer network is the Internet.

24. The method of claim 21, wherein said message is emergency related.

25. The method of claim 21, wherein said priority score is emergency related.

26. A method of performing triage on a plurality of received messages, said method comprising:
- receiving a plurality of messages over a computer network;
- assigning an emergency related priority score based on a cellular phone number to each of said received messages; and
- ordering said received messages based on said assigned emergency related priority score;
- wherein said message originated from at least one of:
- an emergency responder;
- a known emergency information provider;
- a source related to previously received calls;
- a source related to a call previously placed; and
- a source related to a currently active emergency situation; and generating a unique identifying component to identify an outgoing call.

27. A call handling system including a message priority module operable to assign priority scores based on a cellular phone number to electronic messages received by said call handling system;
- including a triage interface operable to display at least a portion of said electronic messages along with corresponding priority scores assigned by said message priority module;
- an integration module operable to present triaged electronic messages to a call handler; a telephonic interface for audio communication between at least one call handler and at least one caller over a telephone network.

* * * * *